US007757109B2

(12) United States Patent
Berthold et al.

(10) Patent No.: US 7,757,109 B2
(45) Date of Patent: Jul. 13, 2010

(54) CIRCUIT ARRANGEMENT FOR ACTIVATING A CIRCUIT BLOCK AND METHOD FOR THE SAME

(75) Inventors: Jörg Berthold, München (DE); Georg Georgakos, Fraunberg (DE); Stephan Henzler, München (DE); Thomas Nirschl, Essex Junction, VT (US); Matthias Schobinger, München (DE); Doris Schmitt-Landsiedel, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 1063 days.

(21) Appl. No.: 11/454,302

(22) Filed: Jun. 15, 2006

(65) Prior Publication Data

US 2007/0038876 A1 Feb. 15, 2007

(30) Foreign Application Priority Data

Jun. 15, 2005 (DE) .................... 10 2005 027 691

(51) Int. Cl.
*G06F 1/26* (2006.01)
*G06F 1/32* (2006.01)

(52) U.S. Cl. ............. 713/322; 713/300; 713/310; 713/320; 713/323; 713/324; 713/330; 713/340; 713/600

(58) Field of Classification Search ........... 713/300, 713/310, 320–324, 330, 340, 400–401, 500–503, 713/600–601
See application file for complete search history.

(56) References Cited

U.S. PATENT DOCUMENTS

| 6,636,976 | B1 * | 10/2003 | Grochowski et al. ....... 713/320 |
| 6,775,787 | B2 * | 8/2004 | Greene ..................... 713/340 |
| 7,000,130 | B2 * | 2/2006 | Adachi ..................... 713/322 |
| 7,035,785 | B2 * | 4/2006 | Grochowski et al. ......... 703/18 |
| 2004/0158750 | A1 | 8/2004 | Syed et al. |
| 2004/0221185 | A1 | 11/2004 | Bose et al. |
| 2004/0230849 | A1 | 11/2004 | Dhong et al. |
| 2005/0081073 | A1 * | 4/2005 | Williams .................. 713/320 |
| 2007/0006012 | A1 * | 1/2007 | Mosur et al. .............. 713/600 |

* cited by examiner

*Primary Examiner*—Thomas Lee
*Assistant Examiner*—Fahmida Rahman
(74) *Attorney, Agent, or Firm*—Brinks Hofer Gilson & Lione

(57) ABSTRACT

An integrated circuit includes functional blocks, a power control unit controlling the provision of power to the different functional blocks of the integrated circuit, a detecting unit detecting if a turned off functional block is to be turned on, and a clock signal control unit controlling the provision of the clock signal for the functional blocks. The clock signal control unit interrupts the clock signal for the activated functional blocks of the integrated circuit for a predetermined number of clock cycles. The power control unit provides power to the turned off functional block during the interrupted clock cycles.

21 Claims, 3 Drawing Sheets

CIRCUIT ARRANGEMENT FOR ACTIVATING A CIRCUIT BLOCK AND METHOD FOR THE SAME

1. PRIORITY CLAIM

This application claims the benefit of priority from German Patent Application No. DE 10 2005 027 691.1, filed Jun. 15, 2005, which is incorporated herein by reference.

BACKGROUND

1. Technical Field

The present invention relates to an integrated circuit, particularly to the activation of a circuit block in an electronic circuit, and to a method for activating a switched-off circuit block to minimize leakage currents.

2. Background Information

To reduce these leakage currents there is the possibility of intermittently turning off circuit blocks of the electronic circuit which are not required, for example of a digital CMOS circuit. If the circuit block is to be brought out of the deactivated state and back into the activated state, its inner capacitors which were discharged in the deactivated state must be charged again, and this leads to an intensified flow of current. Strong, uncontrolled switching activities (glitches), which, in addition to the charging current, cause the flow of current in the supply lines, also occur during the reactivation process. As a result the total current when switching on a circuit block is briefly very high, and this leads to a noticeable voltage drop on the voltage supply network. Consequently, the operating voltage drops, which is seen by the other, adjacent circuit blocks. The briefly reduced voltage supply leads to lower current flows, and this leads to a brief reduction in the switching speed. This reduction in the switching speed can lead to malfunctions as a result of timing infringements in the critical path, and this can lead to malfunctions or to a system failure. However, a loss of data, which is stored in the flip-flops of the blocks, is not anticipated for a sensibly dimensioned supply network.

The voltage drop caused by the reactivation of a circuit block cannot be avoided by regulation of the voltage supply as the switch-on peaks have much lower time constants than the voltage regulator. A voltage regulator would be too sluggish to support these power fluctuations.

While capacitive buffering of the voltage supply is possible in principle, very large capacitors would be required on the electronic circuit's chip for this purpose, the area requirement of which is impractical.

A further problem in this connection is that during operation with turning off circuit blocks, conventionally it must be identified early when which circuit block is required. However, when turning off a small section the situation can occur where only one system cycle is identified in advance, before the associated circuit block is required again. There is therefore no more time in which to activate this block in discrete steps, so it must be estimated in advance when the function block will be required. This can also frequently lead to misactivations, whereby stray power is also generated.

Consequently a need exists to provide a circuit arrangement with which it is possible to activate circuit blocks in short periods without adjacent circuit blocks being adversely affected.

BRIEF SUMMARY

An integrated circuit includes functional blocks, a power control unit controlling the provision of power to the different functional blocks of the integrated circuit, a detecting unit detecting if a turned off functional block is to be turned on, and a clock signal control unit controlling the provision of the clock signal for the functional blocks. The clock signal control unit interrupts the clock signal for the activated functional blocks of the integrated circuit for a predetermined number of clock cycles. The power control unit provides power to the turned off functional block during the interrupted clock cycles.

As a result of interruption of the clock signal for the circuit blocks, i.e. as a result of freezing of the clock cycle for these circuit blocks (clock gating), the associated circuit block can be switched on quickly as the current peak that occurs thereby and the voltage drop resulting therefrom cannot lead to faults in the other circuit blocks. Once the period has ended, both the previously active circuit blocks and the newly switched-on circuit block are available.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
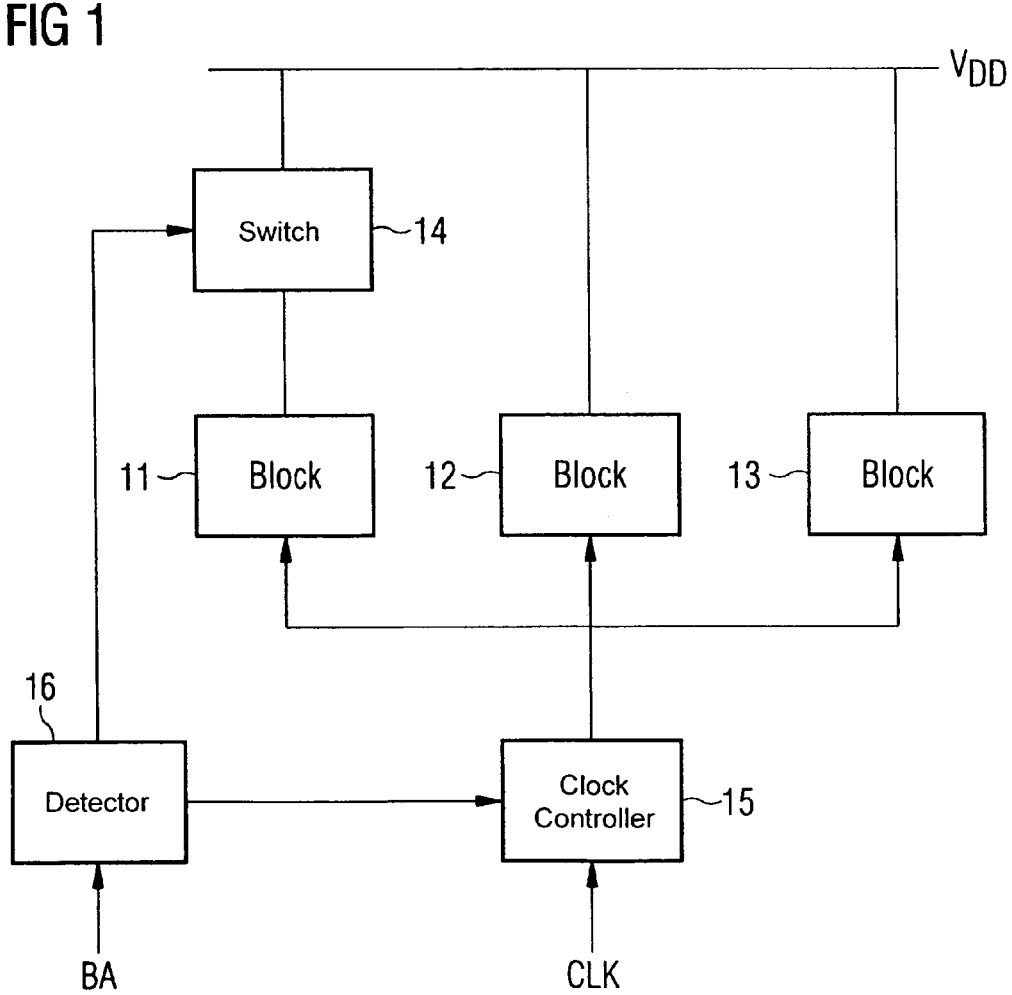
FIG. 1 illustrates an example schematic circuit.

FIG. 1 schematically shows a portion of an electronic circuit which comprises the various circuit blocks 11, 12, 13. These circuit blocks or functional blocks are powered by a supply voltage VDD. In the illustrated system, the circuit block 11 can be deactivated and reactivated by a switching-on/switching-off device 14. The switching-on/switching-off device 14 is shown only for block 11. The other circuit blocks 12, 13 can also be controlled by similar switching-on/switching-off devices. A clock controller 15 is also provided to which the system clock CLK is supplied.

The circuit can accordingly be constructed in such a way that the function block 11 is switched off to minimize leakage losses. If the switched-off function block 11 of the circuit is required again, an activation signal BA can be supplied for example by a system controller (not shown) to a detector 16 which detects if a switched-off circuit block should be switched on again. If there is a signal of this type at the detector 16, the detector communicates this to the clock controller 15. The clock controller pauses the clock cycle for a determined time, which is output to the other circuit blocks 11, 12, and 13. During this period the switching-on/switching-off device switches the circuit block 11 on again. Either the detector activates the circuit switch once the command to freeze the clock has been given to the clock controller 15, or the clock controller itself activates the circuit switch 14 once it has paused the clock for blocks 11 to 13.

If the electrical circuit contains circuit blocks which have to receive or output a continuous stream of data, the idle time during "freezing" of the clock signal would lead to faults as a transmission or reception bit for example would fail. A First-in-First-out (FIFO) memory can be inserted into these circuit blocks, whereby the transmission or reception current can bridge the time for which the remainder of the circuit if frozen as a result of interruption of the clock cycle.

The controller may interrupt the clock for the circuit blocks which are supplied by the voltage source that also supplies the circuit block to be switched on. The circuit blocks, which are connected to the same voltage supply, like the circuit block to be switched on, would be affected by the brief voltage loss, so these circuit blocks are not supplied with the clock signal during the determined period.

Figure 3:
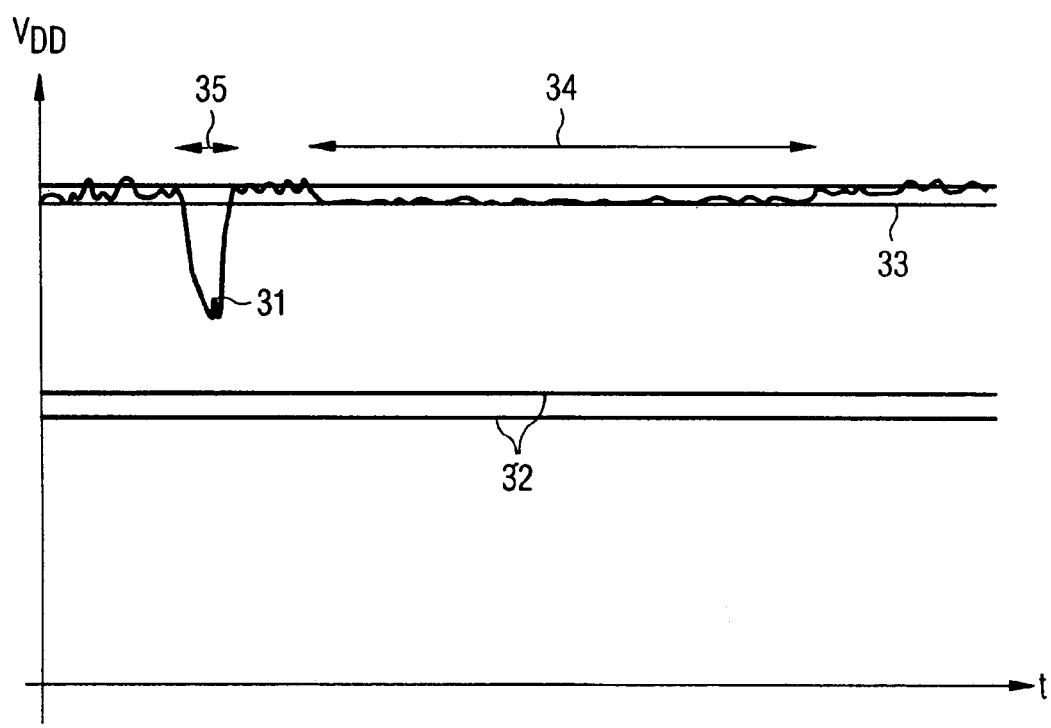
FIG. 3 illustrates voltage characteristic during activation of circuit blocks.

FIG. 3 shows the voltage characteristic over time of VDD. A noticeable voltage drop 31 occurs in the case of rapid reactivation of the circuit block. The limiting values 32, which are approx. 0.4×VDD, are also plotted in FIG. 3. These limiting values 32, which are known as the dynamic noise margin or static noise margin, indicate when the logic circuit connected downstream would see a changed logic state in the case of a change in the voltage signal. This changed logic state would destroy the information content of the logic circuit. As illustrated in FIG. 3, the voltage loss caused by the rapid switching on of the circuit block is lower than the limiting values 32, so for example the information content of the flip-flops connected downstream would not be destroyed. It is thus possible to quickly reactivate a circuit block without changing the logic state of other blocks.

FIG. 3 also shows the limiting value 33 which gives the lower voltage value which gives the maximum tolerable speed degradation. If VDD drops below the limiting value 33, this would lead to intolerable changes in circuit speed. For this reason, the circuit block must be switched on again during a long period 34, and this, however, would persist for a large number of clock cycles. The period 35 during rapid switching on of the circuit block is discernibly shorter, wherein this period can be within one clock cycle. As the clock cycle is paused in the period 35, the voltage drop does not have any effect on the circuit speeds.

Figure 2:
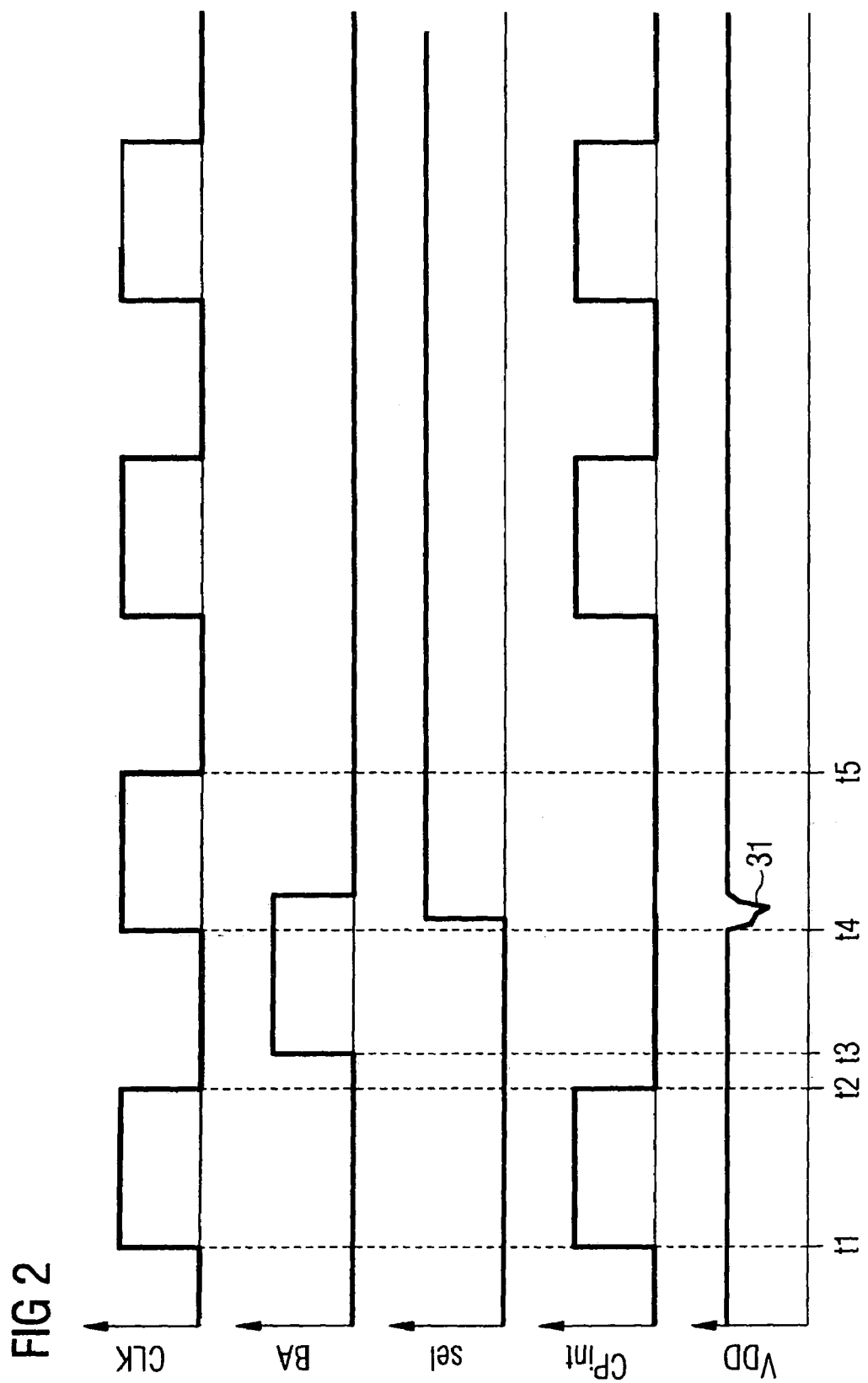
FIG. 2 illustrates the signal characteristic of the various components of the circuit in FIG. 1.

FIG. 2 shows in more detail the signal characteristic of the circuit in FIG. 1. The upper graph shows the system clock CLK, as is supplied for example to the clock controller 15 of FIG. 1. A block activation signal BA is also shown. After the first clock cycle has ended in the period t1 to t2, the block activation signal is supplied to the detector 16 at time t3. The characteristic of the signal sel over time, which illustrates activation of the block, is also shown. Following the block activation signal, the switched-off circuit block is switched on again at time t4 on the next clock signal, so the signal sel is again switched to a high logic state in the present example. The signal sel can, for example, be supplied by the detector 16 to the switching-on/switching-off device 14 which then switches the circuit block 11 of FIG. 1 on again. As can be seen in the lowest curve of the voltage characteristic, reactivation of the circuit block leads to a brief voltage loss 31 which corresponds to the voltage loss shown by FIG. 3. However, the clock cycle forwarded from the clock controller 15 to the other circuit blocks is also interrupted for this period, as the characteristic of the curve CPint shows. The clock cycle supplied by the system clock between t4 and t5 is not forwarded to the function blocks of the electronic circuit, as can be seen in the characteristic of CPint. This clock accordingly drops out for the function blocks, so no switching operations take place in the circuit blocks during this period.

As can be seen in FIG. 2, it is sufficient for the activation signal for switching on the circuit block to be detected one clock signal before the clock cycle, which is interrupted to activate the circuit block that had been deactivated. Rapid reactivation of the circuit block means that circuit blocks can also be switched off for very short periods, for example periods of less than 10 µs, or less than 5 µs, or less than 1 µs, and switched on again. As there is no signal processing in the adjoining circuit blocks during the activation clock, faults consequently cannot occur as a result of the brief voltage drop.

It is therefore intended that the foregoing detailed description be regarded as illustrative rather than limiting, and that it be understood that it is the following claims, including all equivalents, that are intended to define the spirit and scope of this invention.

The invention claimed is:

1. An integrated circuit comprising:
   a plurality of functional blocks;
   a power control unit operable to control a provision of power to the plurality of functional blocks of the integrated circuit;
   a detecting unit operable to detect when a turned off functional block is to be turned on; and
   a clock signal control unit operable to control a provision of a clock signal for the plurality of functional blocks, wherein the clock signal control unit interrupts the clock signal for activated functional blocks of the integrated circuit for one clock cycle, the power control unit providing power to activate the turned off functional block within the one clock cycle.

2. The integrated circuit according to claim 1, wherein the power control unit comprises a transistor operable to control a supply voltage of the functional block to be turned on.

3. The integrated circuit according to claim 1, further comprising a FIFO memory provided in the functional blocks with a continuous stream of data, wherein the FIFO memory receives data that accumulates during the interrupted clock cycle.

4. The integrated circuit according to claim 1, wherein the clock signal control unit interrupts a clock for the active functional blocks which are supplied by a power supply that also supplies the functional block to be turned on.

5. A processor system comprising:
   a plurality of circuit blocks;
   a power supply operable to supply power to the plurality of circuit blocks;
   a power supply enabling/disabling unit operable to enable and disable the power supply to the plurality of circuit blocks; and
   a control unit operable to control a clock signal for the circuit blocks of the plurality of circuit blocks, wherein, upon detecting that a turned off circuit block should be turned on, the control unit interrupts provision of the clock signal to other turned on circuit blocks for one clock cycle, which are supplied by the power supply that also supplies power to the circuit block to be turned on, wherein the power supply enabling/disabling unit turns on the turned off circuit block within the one clock cycle.

6. The processor system according to claim 5, wherein the power supply enabling/disabling unit comprises a transistor operable to control a supply voltage of the circuit block to be turned on.

7. The processor system according to claim 5, further comprising a FIFO memory provided in circuit blocks with a reception of continuous stream of data, wherein the FIFO memory receives data that accumulates during the interrupted clock cycle.

8. An apparatus for saving power in a microprocessor comprising:

a plurality of circuit blocks;

switching means for switching on/switching off at least one of the plurality of circuit blocks;

detecting means for detecting when a switched off circuit block should be switched on; and control means for controlling a clock signal for the plurality of circuit blocks, wherein the control means, upon detecting that a switched off circuit block should be switched on, is operable to interrupt a clock for switched on circuit blocks for one clock cycle, wherein the switching means switches on the switched off circuit block during the one clock cycle.

9. The apparatus according to claim 8, wherein the switching means comprises means for controlling a supply voltage of the circuit block to be switched on.

10. The apparatus according to claim 8, further comprising a FIFO memory provided in circuit blocks with a continuous stream of data, wherein the FIFO memory receives data that accumulates during the interrupted clock cycle.

11. The apparatus according to claim 8, wherein the control means is operable to interrupt a clock for the circuit blocks that are supplied by a voltage that also supplies the circuit block to be switched on.

12. A method for actuating a turned off circuit block in an integrated circuit, the integrated circuit including a plurality of circuit blocks, the plurality of circuit blocks clocked by a clock signal, the method comprising:

detecting an activation signal indicating that power should be supplied to a turned off circuit block;

interrupting a clock signal to other circuit blocks of the integrated circuit for one clock cycle;

supplying power to the turned off circuit block within the one clock cycle; and resuming the clock signal for the other circuit blocks after the one clock cycle.

13. The method according to claim 12, further comprising arranging a transistor between a circuit block and at least one of a VDD or a VSS, wherein the transistor is operable to turn on or turn off the circuit block.

14. The method according to claim 12, further comprising generating an idle time of between approximately 0.1 ns and 2 ns by interrupting the clock cycle.

15. The method according to claim 14, wherein generating the idle time comprises generating an idle time of between approximately 0.5 ns and 1.4 ns.

16. The method according to claim 12, further comprising detecting the activation signal for turning on the circuit block on clock cycle before the start of the period for which the clock cycle is interrupted to turn on the circuit block.

17. The method according to claim 12, further comprising switching a circuit block off and on again within a period of less than approximately 10 microseconds.

18. The method according to claim 17, wherein switching the circuit block comprises switching the circuit block off and on again within a period of less than approximately 5 microseconds.

19. A method according to claim 18, wherein switching the circuit block comprises switching the circuit block off and on again within a period of less than approximately 1 microsecond.

20. A method for saving power in a microprocessor, the microprocessor including a plurality of functional blocks which are clocked by a clock signal, the method comprising:

detecting an activation signal indicating that a switched off functional block should be switched on;

interrupting a provision of the clock signal for a switched on functional block for one clock cycle;

switching on the switched off functional block within the one clock cycle; and resuming the clock signal for the plurality of functional blocks after the one clock cycle.

21. An apparatus that actuates a turned off circuit block in an integrated circuit, the integrated circuit including a plurality of circuit blocks, the plurality of circuit blocks clocked by a clock signal, comprising:

means for detecting an activation signal indicating that power should be supplied to a turned off circuit block;

means for interrupting a clock signal to other circuit blocks of the integrated circuit for one clock cycle;

means for supplying power to the turned off circuit block within the one clock cycle; and means for resuming the clock signal for the other circuit blocks after the one clock cycle.

\* \* \* \* \*